US007542952B2

(12) United States Patent
Yang et al.

(10) Patent No.: US 7,542,952 B2
(45) Date of Patent: Jun. 2, 2009

(54) METHODS FOR MULTIPLE ATTRIBUTE DECISION ANALYSIS UNDER UNCERTAINTY

(76) Inventors: Jian-Bo Yang, 4 Silverbirch Close, Sale Cheshire (GB) M33 4JR; Xu Dong-Ling, 4 Silverbirch Close, Sale Cheshire (GB) M33 4JR ( * ) Notice: Subject to any disclaimer, the term of this patent is extended or adjusted under 35 U.S.C. 154(b) by 0 days.

(21) Appl. No.: 11/861,137

(22) Filed: Sep. 25, 2007

(65) Prior Publication Data
US 2008/0040305 A1    Feb. 14, 2008

Related U.S. Application Data

(63) Continuation of application No. 10/426,666, filed on Apr. 30, 2003, now abandoned.

(60) Provisional application No. 60/377,350, filed on Apr. 30, 2002.

(51) Int. Cl.
*G06N 5/00* (2006.01)
(52) U.S. Cl. ...................................................... 706/45
(58) Field of Classification Search .................. 706/45
See application file for complete search history.

(56) References Cited

U.S. PATENT DOCUMENTS 6,463,431 B1   10/2002   Schmitt

OTHER PUBLICATIONS

Jian-Bo Yang "Rule and utility based evidential reasoning approach for multiattribute decision analysis under uncertainties" European Journal of Operational Research vol. 131, Issue 1, May 16, 2001, pp. 31-61 doi:10.1016/j.physletb.2003.10.071.*
Barzilai, J., 1997. Deriving weights from pairwise comparison matrices. Journal of Operational Research Society 48, 1226-1232.
Belton, V., 1986. Comparison of the analytic hierarchy process and a simple multi-attribute value function. European Journal of Operational Research 26, 7-21.
Belton, V., Gears, T., 1981. On a short-coming of Saaty's method of analytic hierarchy. OMEGA International Journal of Management Science 11 (3), 228-230.
Farguhar, P.H., 1984. Utility assessment methods. Management Science 30 (11), 1280-1300.
Hwang, C.L., Yoon, K., 1981. Multiple Attribute Decision Making Methods and Applications. A state-of-Art Survey. Springer, Berlin.
Jacquet-Lagreze, E., Siskos, J., 1982. Assessing a set of additive utility functions for multicriteria decision making the UTA method. European Journal of Operational Research 10, 151-164.

(Continued)

*Primary Examiner*—David R Vincent
*Assistant Examiner*—Lut Wong
(74) *Attorney, Agent, or Firm*—Bracewell & Giuliani LLP (57) ABSTRACT

A multiple criteria decision making method in which a plurality of basic criteria are assessed in order to generate an assessment on a general criterion is provided. An example of such a method can include the steps of: making an assessment of the $i^{th}$ basic criterion under a set of grades; and transforming the assessment to an assessment of the general criterion under the set of grades using a matrix equation.

3 Claims, 7 Drawing Sheets

OTHER PUBLICATIONS

Johnson, C.R., Beine, W.B., Wang, T.J., 1979. Right-left asymmetry in an eigenvector ranking procedure. Journal of Mathematical Psychology 19, 61-64.

Keeney, R.L., Raiffa, H., 1976. Decision with Multiple Objectives: Preference and Value Tradeoffs. Wiley, New York.

Sen, P., Yang, J.B., 1995. Multiple criteria decision making in design selection and synthesis. Journal of Engineering Design 6 (3), 207-230.

Stewart, T.J., 1992. A critical survey on the status of multiple criteria decision making theory and practice. OMEGA International Journal of Management Science 20 (5 & 6), 569-586.

Wang, J., 1997. A subjective methodology for safety analysis of safety requirements specifications. IEEE Transactions on Fuzzy Systems 5 (3), 1-13.

Wang, J., Yang, J.B., Sen, P., 1995. Safety analysis and synthesis using fuzzy sets and evidential reasoning. Reliability Engineering and System Safety 47 (2), 103-118.

Wang, J., Yang, J.B., Sen, P., 1996. Multi-person and multi-attribute design evaluations using evidential reasoning based on subjective safety and cost analysis. Reliability Engineering and System Safety 52, 113-127.

Winston, W., 1994. Operations Research Applications and Algorithms. Duxburg Press, California.

Yang, J.B., 1996. Multiple Criteria Decision Making Methods and Applications. Hunan Publishing House, Changsha.

Yang, J.B., Sen, P. 1994. A general multi-level evaluation process for hybrid MADM with uncertainty. IEEE Transactions on Systems, Man, and Cybernetics 24 (10),1458-1473.

Yang, J.B., Sen, P., 1996. Preference modelling by estimating local utility functions for multiobjective optimisation. European Journal of Operational Research 95, 115-138.

Yang, J.B., Sen, P., 1997. Multiple attribute design evaluation of large engineering products using the evidential reasoning approach. Journal of Engineering Design 8 (3), 211-230.

Yang, J.B., Singh, M.G., 1994. An evidential reasoning approach for multiple attribute decision making with uncertainty. IEEE Transactions on Systems, Man, and Cybernetics 24 (1), 1-18.

Yang, J.B., Xu, D.L., 1998. Knowledge based executive car evaluation using the evidential reasoning approach, in: Baines, Tieb-Bendiabm, Zhao. (Eds.), Advances in Manufacturing Technology—XII. Professional Engineering Publishing, London, UK, pp. 741-749.

Belton, V., Stewart, T. Multiple Criteria Decision Analysis—An Integrated Approach, ISBN 07923-7505-X, Kluwer Academic Publishers, 2001.

Dyer, J.S., Fishbum, P.C., Steuer, R.E., Wallenius, J. and Zionts, S., Multiple criteria decision making, Multiattribute utility theory: the next ten years, Management Science, vol. 38, No. 5, 1992, 645-654.

Islei, G., Lockett, A.G., Judgemental modeling based on geometric least square, European Journal of Operational Research, vol. 36, 1988, 27-35.

Triantaphyllou, E., Multi-Criteria Decision Making Methods: A Comparative Study, Applied Optimization Series, vol. 44 ISBN 0-7923-6607-7, Kluwer Academic Publishers, 2000.

Sonmez, M., Yang, J.B., and Holt, G.D. Addressing the contractor selection problem using an evidential reasoning approach, Engineering, Construction and Architectural Management, vol. 8, No. 3, pp. 198-210, 2001.

Yang, J.B., Wang, J., Xu, D.L., Dale, B.G., Kieran, O., and Ruxton, T. Multiple criteria decision analysis applied to safety and cost synthesis, Journal of UK Safety and Reliability Society, vol. 21, No. 2, 2001 (ISSN 0961-7353).

Wang, J., and Yang, J.B., A subjective safety based decision making approach for evaluation of safety requirements specifications in software development, International Journal of Reliability, Quality and Safety Engineering, vol. 8, No. 1, pp. 35-57, 2001.

Yang, J.B., Rule and utility based evidential reasoning approach for multiple attribute decision analysis under uncertainty, European Journal of Operational Research, vol. 131, No. 1, pp. 3161, 2001.

Yang, J.B., Sen, P., and Meldrum, P., Multiple attribute evaluation in engineering decision support using limited compensation and reference designs, Information and Systems Engineering, vol. 2, Nos. 3 & 4, 1996, pp. 159-181, ISSN 0929-9610.

Sen. P., and Yang, J.B., Design decision making based upon multiple attribute evaluation and minimal preference information, Mathematical and Computer Modelling, vol. 20, No. 3, 1994, pp. 107-124, ISSN 0895-7177.

Yang, J.B., and Sen, P. Evidential reasoning based hierarchical analysis for design selection of ship retro-fit options, in Artificial Intelligence in Design '94, Gero, J. S., and Sudweeks F. (eds.), Kluwer Academic Publishers, the Netherlands, 1994, pp. 327-344, ISBN 0-7923-2994-5.

Yang, J.B., and Sen, P., A hierarchical evaluation process for multiple attribute design selection with uncertainty, in Industrial and Engineering Applications of Artificial Intelligence and Expert Systems (IEA/AIE-93), Chung, P.W.H., Lovegrove, G. and Ali, M. (eds.), Gordon and Breach Science Publishers, Switzerland, 1993, pp. 484-493, ISBN 2-88124-604-4.

Zhang, Z.J., Yang, J.B., and Xu, D.L., A hierarchical analysis model for multiobjective decision making, in Analysis, Design and Evaluation of Man-Machine System 1989, Selected Papers from the 4th IFAC/IFIP/IFORS/IEA Conference, Xian, P.R., China, Sep. 1989, Pergamon, Oxford, UK, 1990, pp. 13-18.

Xu, D.L., and Yang, J.B., Introduction to multi-criteria decision making and the evidential reasoning approach, Working Paper Series, Paper No. 0106, ISBN: 1 86115 111 X (http://www.unist.ac.uk/management), Manchester School of Management, UMIST, 2001, pp. 1-21.

Sonmez, M., Yang, J.B., and Holt, G.D., Addressing the contractor selection problem using an evidential reasoning approach, Working Paper Series, Paper No. 2006, ISBN: 186115 075 X, (http://www-umist.ac-uk/management), Manchester School of Management, UMIST, 2000, pp. 125.

Sonmez, M, Yang, J.B., and Graham G., A hypothetical method for evaluating energy policy options using the evidential reasoning approach, Working Paper Series, Paper No. 2005, ISBN: 1 86115 074 1, (http://www.umist.ac.uk/management), Manchester School of Management, UMIST, 2000, pp. 1-20.

Sen, P. and Yang, J.B., Multiple Criteria Decision Support in Engineering Design, SpringerVerlag, London, 1998, ISBN 3-540-19932-2.

Shafer, G.A., Mathematical Theory of Evidence. Princeton University Press, Princeton, 1976.

Yager, R.R., Decision-making under various types of uncertainties, Journal of Intelligent & Fuzzy Systems, vol. 3, No. 4, pp. 317-323, 1995.

Yang, J.B., Dale, B.G., and Siow, C.H.R., Self-assessment of excellence: an application of the evidential reasoning approach, International Journal of Production Research, vol. 39, No. 16, pp. 3789-3812, 2001.

Yeh et al., "An Algorithm for Fuzzy Multi-Criteria Decisionmaking," IEEE International Conference on Intelligent Processing System, Oct. 1997.

Yang et al., "The Interactive Step Trade-Off Method (ITSM) for Multiobjective Optimization," IEE Transactions on System, Man, and Cybernetics, May/Jun. 1990.

Jian-Bo Yang, "Rule and utility based evidential reasoning approach for mutiattribute decision analysis under uncertainties," European Journal of Operational Research, vol. 131, Issue 1, May 16, 2001, pp. 31-61.

* cited by examiner

Figure 1    Quality Criteria of a Motor Engine

Figure 2    General Criterion and Basic Criteria

Figure 3      IDS Main Window

Figure 4      Transform Numerical Data

Figure 5    Transform Qualitative Assessment

Figure 6    Assign Utilities Graphically

Figure 7    Put in Random Numerical Data

Figure 8    Assign Degrees of Belief

Figure 9    Graphic Display of Distributed Assessment

Figure 10    Graphic Display of Utility Interval

Figure 11    Graphic Comparison of Alternatives

Figure 12    Ranking of Motorcycles

METHODS FOR MULTIPLE ATTRIBUTE DECISION ANALYSIS UNDER UNCERTAINTY

CROSS REFERENCE TO RELATED APPLICATIONS

This application is a continuation of and claims priority to and the benefit of U.S. patent application Ser. No. 10/426,666, titled "Methods and Apparatus for Decision Making," filed on Apr. 30, 2003 now abandoned, which claims priority to and the benefit of Provisional Patent Application No. 60/377,350, filed on Apr. 30, 2002.

FIELD OF THE INVENTION

The present invention relates to methods and apparatus for decision making, including software therefor.

BACKGROUND OF THE INVENTION

Decision making is a most common human activity. Individuals and organisations make all kinds of decisions in a variety of ways on a regular basis. Most decision problems are associated with a number of criteria, which may be measured in different ways, be in conflict with one another, and comprise both a quantitative and qualitative nature. In many situations, decision makers may have to make decisions on the basis of incomplete or partial information. For instance, buying a car may be an individual or a family decision and a customer will not buy a car without taking into account several criteria such as price, safety measures, size of engine, and general quality. Similarly, a company often will not do business with a supplier without assessing many criteria such as financial stability, technical capability, quality and after sales services.

There is a large literature associated with decision sciences, in which techniques for aiding or actually making decisions are proposed. Of most relevance to the present application is Multiple Criteria Decision Analysis (MCDA), which is an important area of decision sciences wherein scientific methods are investigated and developed in order to support decision making with multiple criteria.

A decision associated with multiple criteria is deemed to be properly made if all criteria in conflict are properly balanced and sufficiently satisfied. A MCDA problem can be generally modelled using a decision matrix, where a column represents a criterion, a row an alternative decision, and an element the outcome of a decision on a criterion. The decision matrix for a car selection problem, for example, may look like Table 1.

TABLE 1

Example of Decision Matrix

| | Engine Size | Fuel Consumption | Price | General Quality |
|---|---|---|---|---|
| Car 1 | 1400 cc | 40 miles/gallon | £8,000 | … Good |
| Car 2 | 1500 cc | 45 miles/gallon | £9,000 | … Excellent |
| . | . | . | . | . . |
| . | . | . | . | . . |
| . | . | . | . | . . |
| Car N | 1100 | 47 miles/gallon | £7,000 | … Good |

Several methods have been proposed to deal with MCDA problems represented in the form of a decision matrix. Multiple criteria utility (value) function (MCUF) methods are among the simplest and most commonly used (see, for example, E. Jacquet-Lagreze and J. Siskox, "Assessing a set of additive utility functions for multicriteria decision making, the UTA Method", European Journal of Operational Research, Vol. 10, pp. 151-164, 1982, and R. L. Keeney and H. Raiffa, Decision with Multiple Objectives: Preference and Value Tradeoffs, John Wiley and Sons, New York, 1976).

The MCUF methods are based on the estimation of utility for each outcome in a decision matrix. However, if a MCDA problem involves a large number of criteria and alternative decisions, estimating the utilities of all outcomes at every alternative on each criterion will become a tedious procedure and as such the MCUF methods will be difficult to apply in a satisfactory way (T. J. Stewart, "A critical survey on the status of multiple criteria decision making theory and practice", OMEGA International Journal of Management Science, Vol. 20, No. 5-6, pp. 569-586, 1992).

Pairwise comparisons between pairs of criteria were primarily used to estimate relative weights of criteria in several methods including the eigenvector method (T. L. Saaty, The Analytic Hierarchy Process, University of Pittsburgh, 1988), the geometric least square method (G. Islei and A. G. Lockett, "Judgmental modelling based on geometric least squares", European Journal of Operational Research, Vol. 36, No. 1, pp. 27-35, 1988) and the geometric mean method. Pairwise comparison matrices have also been used to assess alterative decisions with respect to a particular criterion such as in Analytical Hierarchy Process (AHP) (Saaty, ibid) and in judgmental modelling based on the geometric least square method (Islei and Locket, ibid). However, using pairwise comparisons to assess alternatives may lead to problems such as rank reversal as within the AHP framework (V Belton and T Gears "On a short-coming of Saaty's method of analytic hierarchy", OMEGA, vol. 11, No. 3, pp 228-230, 1981; Stewart, ibid). These difficulties have lead to a long debate on how quantitative and qualitative assessments should be modelled and aggregated. Furthermore, both MCUF and AHP methods are incapable of properly coping with decision problems with missing information. If assessment information is missing for one criterion, one has to either abandon this criterion altogether or make assumptions, i.e., to use fabricated information. However, this may mislead the decision making process.

Fuzzy sets based methods have been developed to deal with MCDA problems with uncertainties. The main feature of such methods is their capability of handling subjective judgements in a natural manner. Therefore, they provide attractive frameworks to represent qualitative criteria and model human judgements (R R Yager "Decision-making under various types of uncertainties", Journal of Intelligent and Fuzzy Systems, Vol. 3, No. 4, pp 317-323, 1995). However, fuzzy set methods suffer from two fundamental drawbacks. Firstly, they use a simplistic approach and limited linguistic variables to model a variety of information including both precise numbers and imprecise judgements. The consequences of this modelling strategy include the loss of precision in describing precise data and the lack of flexibility in capturing the diversity of information. The second drawback results from the use of fuzzy operations for criteria aggregation. Traditional fuzzy operators may lead to the loss of information in the process of aggregating a large number of criteria (J Wang, J B Yang and P Sen "Safety analysis and synthesis using fuzzy sets and evidential reasoning", Reliability Engineering and Systems Safety, Vol. 47, No. 2, pp 103-118, 1995).

The present inventors have developed a MCDA method which has been termed evidential reasoning (ER) (see J. Wang, J. B. Yang and P. Sen, "Safety analysis and synthesis using fuzzy sets and evidential reasoning", Reliability Engineering and System Safety, Vol. 47, No. 2, pp. 103-118, 1995, J. B. Yang and M. G. Singh, "An evidential reasoning approach for multiple attribute decision making with uncertainty", IEEE Transactions on Systems, Man and Cybernetics, Vol. 24, No. 1, pp. 1-18, 1994; J. B. Yang and P. Sen, "A general multi-level evaluation process for hybrid MADM with uncertainty", IEEE Transactions on Systems, Man, and Cybernetics, Vol. 24, No. 10, pp. 1458-1473, 1994; and Z. J. Zhang, J. B. Yang and D. L. Xu, "A hierarchical analysis model for multiobjective decision making", in Analysis, Design and Evaluation of Man-Machine System 1989, Selected Papers from the 4th IFAC/IFIP/IFORS/IEA Conference, Xian, P. R. China, September 1989, Pergamon, Oxford, UK, pp. 13-18, 1990).

In the ER approach, it is proposed to use the concept of belief degrees in an assessment framework to model subjective judgements and develop an evidential reasoning algorithm to aggregate criteria in the assessment framework (Zhang, Yang and Xu; ibid: Yang and Singh, ibid; Yang and Sen, ibid). Compared with fuzzy sets methods, the ER approach provides a more flexible way of modelling human judgements (Yang and Sen, ibid) and the ER criteria aggregation process is also based on the rigorous Dempster-Shafer theory of evidence (G. A. Shafer, Mathematical Theory of Evidence, Princeton University Press, Princeton, USA, 1976, the contents of which, together with the contents of the other publications cited above, are hereby incorporated by reference). However, the prior art ER technique as described in the above mentioned publications is primarily of academic interest, since it is unable to properly accommodate a variety of "real life" situations. For example, the prior art technique is not capable of accommodating precise data or properly handling incomplete information, which may be caused due to a lack of information, the complexity of a decision problem and the inability of humans to provide precise judgements. Also, the old ER algorithm does not provide a rigorous process of aggregating incomplete information.

Therefore, there is a need to provide an improved MCDA technique which is capable of dealing with "real life" situations, and of overcoming the above described problems associated with the prior art.

SUMMARY OF THE INVENTION

The present invention addresses the aforesaid need, and overcomes the above described problems. The present invention provides a rigorous means to support in a practical way the solution of MCDA problems. It is capable of dealing with quantitative and qualitative information, and can handle imprecise subjective information in a way that is consistent and reliable.

According to a first aspect of the invention there is provided a multiple criteria decision analysis method in which a plurality of L basic criteria are assessed so as to generate an assessment of the one or more entities in which the assessments of each entity on the plurality of L basic criteria expressed as $\{(H_n \beta_{n,i}), n=1, \ldots, N\}$ for $i=\{1, \ldots, L\}$ are aggregated in order to generate an overall assessment for the entity on a general criterion. According to an example of an embodiment of such a method, the method can include the step of: assigning weights $W_i$ ($i=1, \ldots, L$) to each of the L basic criteria according to a relative importance determined by a decision maker of the basic criteria to the general criterion. The weights may be assigned directly by a decision maker or estimated.

The method can also include the steps of: calculating by a computer a set of normalized weights $\omega_i$ using the following equation:

$$\omega_i = \frac{W_i}{\sum_{j=1}^{L} W_j} (i = 1, \ldots L);$$

calculating by the computer weighted degrees of belief defining basic probability mass $m_{n,i}$, using the following equation:

$$m_{n,i} = \omega_i \beta_{n,i}, (n=1, \ldots, N; i=1, \ldots, L),$$

where $\beta_{n,i}$ is the degree to which the $i^{th}$ basic criterion is assessed to $H_n$, $H_n$ is the $n^{th}$ grade for assessment of the general criterion, the general criteria being assessed to N grades, and $m_{n,i}$ represents the degree in which the $i^{th}$ basic criterion supports a hypothesis that the general criterion is assessed to the $n^{th}$ grade of $H_n$; and calculating by the computer a remaining probability mass $m_{H,i}$ using the following equation:

$$m_{H,i} = 1 - \sum_{n=1}^{N} m_{n,i} (i = 1, \ldots, L).$$

In this way, it is possible to deal with incomplete information.

The method can also include the steps of: displaying on a computer-generated graphical user interface comparative results of the overall assessment to thereby enhance entity evaluation; and decomposing $m_{H,i}$ into $\overline{m}_{H,i}$ and $\tilde{m}_{H,i}$, wherein:

$$m_{H,i} = \overline{m}_{H,i} + \tilde{m}_{H,i},$$

$$\overline{m}_{H,i} = 1 - \omega_i, \text{ and}$$

$$\tilde{m}_{H,i} = \omega_i \left(1 - \sum_{n=1}^{N} \beta_{n,i}\right) \text{ for } i = 1, \ldots, L.$$

This approach permits greatly advantageous treatment of incomplete information.

The $m_{n,i}, \overline{m}_{H,i}$ and $\tilde{m}_{H,i}$ ($i=1, \ldots, L$) may be aggregated into combined probability masses $I_{n,L}, \overline{I}_{H,L}$ and $\tilde{I}_{H,L}$, respectively, using the following equations i) to ix) in a recursive manner, where:

$$I_{n,1} = m_{n,1}, (n = 1, 2, \ldots, N), \quad \text{i)}$$

$$I_{H,1} = m_{H,1}, \quad \text{ii)}$$

$$\tilde{I}_{H,1} = \tilde{m}_{H,1}, \quad \text{iii)}$$

$$\overline{I}_{H,1} = \overline{m}_{H,1}, \quad \text{iv)}$$

$$K_{i+1} = \left[1 - \sum_{t=1}^{N} \sum_{\substack{j=1 \\ j \neq t}}^{N} I_{t,i} m_{j,i+1}\right]^{-1}, \quad \text{v)}$$

$$I_{n,i+1} = \quad \text{vi)}$$
$$K_{i+1}[I_{n,i} m_{n,i+1} + I_{H,i} m_{n,i+1} + I_{n,i} m_{H,i+1}] (n = 1, 2, \ldots, N),$$

$$\tilde{I}_{H,i+1} = K_{i+1}[\tilde{I}_{H,i} \tilde{m}_{H,i+1} + \overline{I}_{H,i} \tilde{m}_{H,i+1} + \tilde{I}_{H,i} \overline{m}_{H,i+1}], \quad \text{vii)}$$

$$\overline{I}_{H,i+1} = K_{i+1}[\overline{I}_{H,i} \overline{m}_{H,i+1}], \text{ and} \quad \text{viii)}$$

$$I_{H,i+1} = \overline{I}_{H,i+1} + \tilde{I}_{H,i+1}, i = \{1, 2, \ldots, L-1\}. \quad \text{ix)}$$

This permits the probability masses to be combined, and allows upper and lower bounds of probability masses to be provided. From this, ranges of combined assessments can be generated.

Combined degrees of belief $\beta_n$ and $\beta_H$ may be generated using the equations:

$$\beta_n = \frac{l_{n,L}}{1 - \bar{l}_{H,L}} n = 1, 2, \ldots, N, \text{ and}$$

$$\beta_H = \frac{\bar{l}_{H,L}}{1 - \bar{l}_{H,L}},$$

where $\beta_n$ is a degree of belief to which the general criterion is assessed to the $n^{th}$ grade $H_n$, and $\beta_H$ is a remaining degree of belief which is not assigned to any specific grade.

The overall assessment can then be generated for each entity "a" on the general criterion represented as: $s(a) = \{(H_1, \beta_1(a)), \ldots, (H_n, \beta_n(a)), \ldots, (H_N, \beta_N(a)), (H_H, \beta_H(a))\}$.

Further according to the exemplary embodiment of the method, each grade $H_{n+1}$ is more favorable than $H_n$, performance indicators of a general criterion may be generated using the equations:

$$u_{\max} = \sum_{n=1}^{N-1} \beta_n u(H_n) + (\beta_N + \beta_H) u(H_N),$$

$$u_{\min} = (\beta_1 + \beta_H) u(H_1) + \sum_{n=2}^{N} \beta_n u(H_n), \text{ and}$$

$$u_{avg} = \frac{u_{\max} + u_{\min}}{2},$$

wherein $u_{max}$, $u_{min}$, and $u_{avg}$ are the best possible, worst possible and average performance indicators respectively, and $u(H_n)(n=1, \ldots N)$ is optionally defined by $$u(H_n) = \frac{n-1}{N-1}.$$

Alternatively, $u(H_n)$ may be estimated by a decision maker.

Still further, according to the exemplary embodiment of the method the values of $\beta_{n,i}$ can be determined by making an assessment $\{(K_{m,i}, \gamma_{m,i}), m=1, \ldots, M\}$ of the $i^{th}$ basic criterion under a set of grades $\{K_{m,i}, m=1, \ldots, M\}$ defining original assessments; and transforming the assessment $\{(K_{m,i}, \gamma_{m,i}), m-1, \ldots, M\}$ by a computer to an assessment $\{(H_n, \beta_{n,i}), n=1, \ldots, N\}$ of the general criterion under a set of grades $\{H_n, n=1, \ldots, N\}$ so that the assessments of the L basic criteria using different sets of grades are transformed into those using a common set of grades and the transformed assessments are equivalent to the original assessments in terms of value or utility to a decision maker. The transformation can use the following matrix:

$$\begin{bmatrix} \beta_{1,i} \\ \beta_{2,i} \\ \vdots \\ \beta_{N,i} \end{bmatrix} = \begin{bmatrix} \alpha_{1,1} & \alpha_{1,2} & \cdots & \alpha_{1,M} \\ \alpha_{2,1} & \alpha_{2,2} & \cdots & \alpha_{2,M} \\ \vdots & \vdots & \ddots & \vdots \\ \alpha_{N,1} & \alpha_{N,2} & \cdots & \alpha_{N,M} \end{bmatrix} \begin{bmatrix} \gamma_{1,i} \\ \gamma_{1,i} \\ \vdots \\ \gamma_{M,i} \end{bmatrix}$$

where:

$H_n$ is the $n^{th}$ grade for assessment of the general criterion;

$K_{m,i}$ is the $m^{th}$ grade for assessment of the $i^{th}$ basic criterion;

$\alpha_{n,m}$ is the degree to which $K_{m,i}$ implies $H_n$;

$\gamma_{m,i}$ is the degree to which the $i^{th}$ basic criterion is assessed to $K_{m,i}$; and $\beta_{n,i}$ is the degree to which the $i^{th}$ basic criterion is assessed to $H_n$.

According to another aspect of embodiments of the present invention there is provided a carrier medium storing a computer program, which performs the various aspects of the various embodiments of the present invention. In this instance, a decision maker may be a user of the computer program.

Methods, computer programs and carrier media therefor in accordance with the invention will now be described with reference to the accompanying drawings.

DETAILED DESCRIPTION OF THE INVENTION

Figure 11:
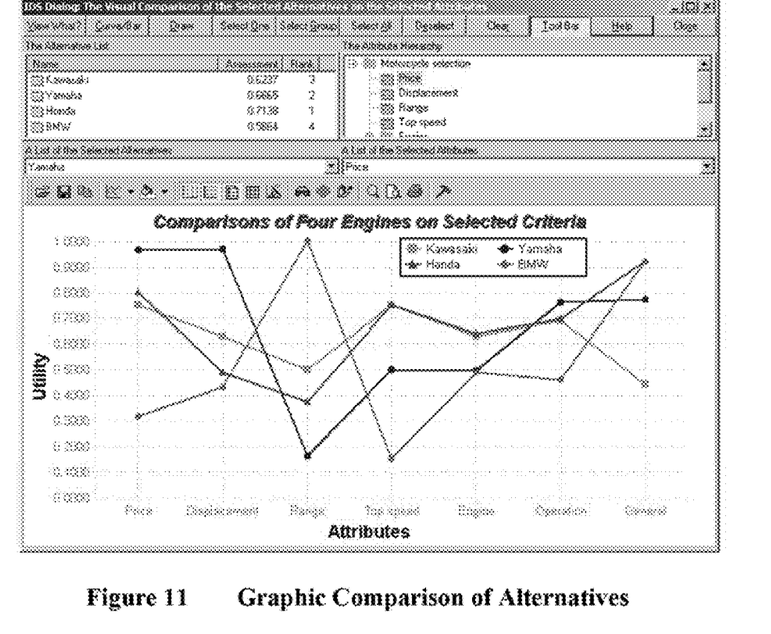
FIG. 11 shows a graphical display of assessments of many entities (motorcycles) on different attributes according to an embodiment of the present invention.
Figure 12:
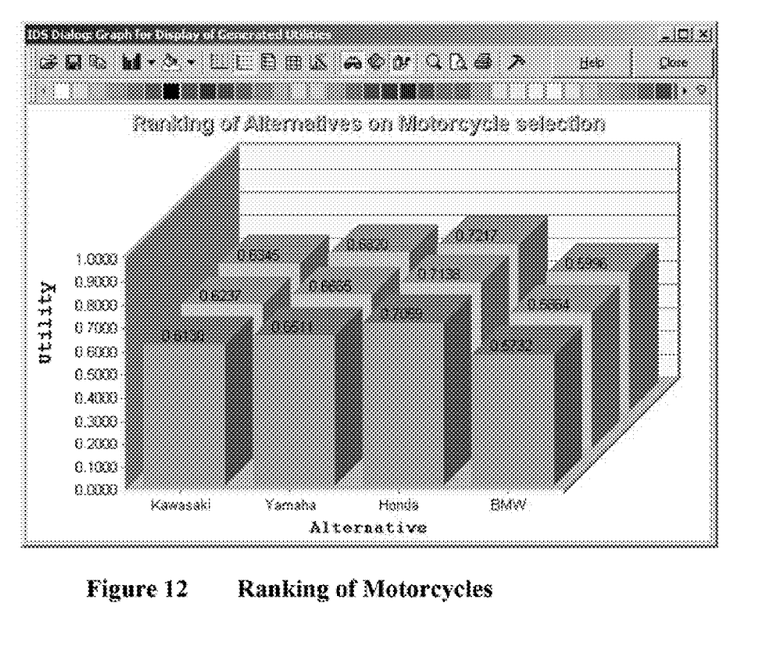
FIG. 12 shows a graphical display which portrays the ranking of four motorcycles generated by a preferred method of the invention.
Figure 13:
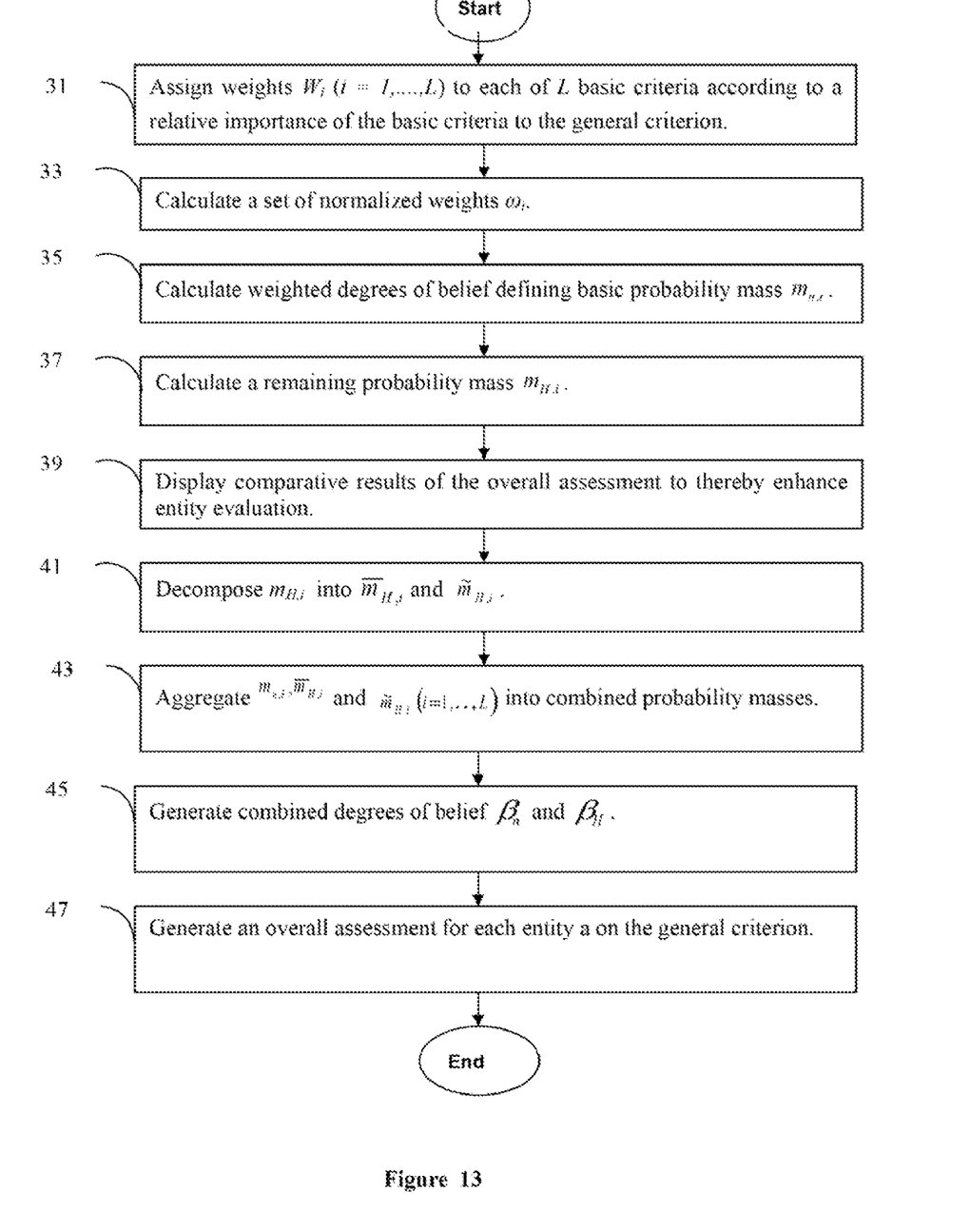
FIG. 13 shows a block flow diagram illustrating a high level decision flow according to an embodiment of the present invention.

FIGS. 1-13 illustrate a computer implemented multiple criteria decision analysis method in which a plurality of L basic criteria of one or more entities are assessed so as to generate an assessment of the one or more entities in which the assessments of each entity on the plurality of L basic criteria expressed as $\{(H_n \beta_{n,i}), n=1, \ldots, N\}$ for $i=\{1, \ldots, L\}$ are aggregated in order to generate an overall assessment for the entity on a general criterion with FIG. 13 providing a high-level decision flow and FIGS. 1-12 providing details of the method steps according to an embodiment of the present invention.

Referring to FIG. 13, an embodiment of the method can include the steps of assigning weights $W_i$ ($i=1, \ldots, L$) to each of the L basic criteria according to a relative importance determined by a decision maker of the basic criteria to the general criterion (block 31), calculating a set of normalized weights $\omega_i$ (block 33), calculating weighted degrees of belief defining basic probability mass $m_{n,i}$ (block 35), calculating a remaining probability mass $m_{H,i}$ (block 37), and displaying on a computer-generated graphical user interface comparative results of the overall assessment to thereby enhance entity evaluation (block 39). The method can also include the steps of decomposing $m_{H,i}$ into $\overline{m}_{H,i}$ and $\tilde{m}_{H,i}$ (block 41), aggregating $m_{n,i}, \overline{m}_{H,i}$ and $\tilde{m}_{H,i}$ ($i=1, \ldots, L$) into combined probability masses $I_{n,L}, \overline{I}_{H,L}$ and $\tilde{I}_{H,L}$ (block 43), generating combined degrees of belief belief $\beta_n$ and $\beta_H$ (block 45), and generating an overall assessment for each entity a on the general criterion (block 47).

A more detailed description of the individual steps according to various aspects of various embodiments of the present invention are provided below with reference to FIGS. 1-12.

Handling Qualitative and Quantitative Information

Embodiments of the present invention permit the assessment of both quantitative and qualitative information, which are subject to a range of uncertainties. Instead of using a decision matrix, embodiments of the present invention described a decision problem using a generalised decision matrix, an example of which is shown in Table 2 for the car selection problem which was described above in relation to Table 1. The main difference between a decision matrix and a generalised decision matrix is that the element of the latter can be a value or a distribution in a belief structure to accommodate uncertainties in human judgements.

TABLE 2

Generalised Decision Matrix

|  | Engine Size | Fuel Consumption (mile/gallon) | Price | ... | General Quality |
|---|---|---|---|---|---|
| Car 1 | 1400 cc | 35 (50%) 40 (50%) | £8,000 | ... | Good (75%) Excellent (25%) |
| Car 2 | 1500 cc | 40 (33%), 45 (33%) 50 (33%) | £9,000 | ... | Good (35%) Excellent (65%) |
| . | . | . | . | . . | . |
| . | . | . | . | . . | . |
| . | . | . | . | . . | . |
| Car N | 1100 | 45 (25%), 46 (25%) 48 (25), 49 (25%) | £7,000 | ... | Average (15%) Good (70%) Excellent (5%) Unknown (10%) |

Figure 1:
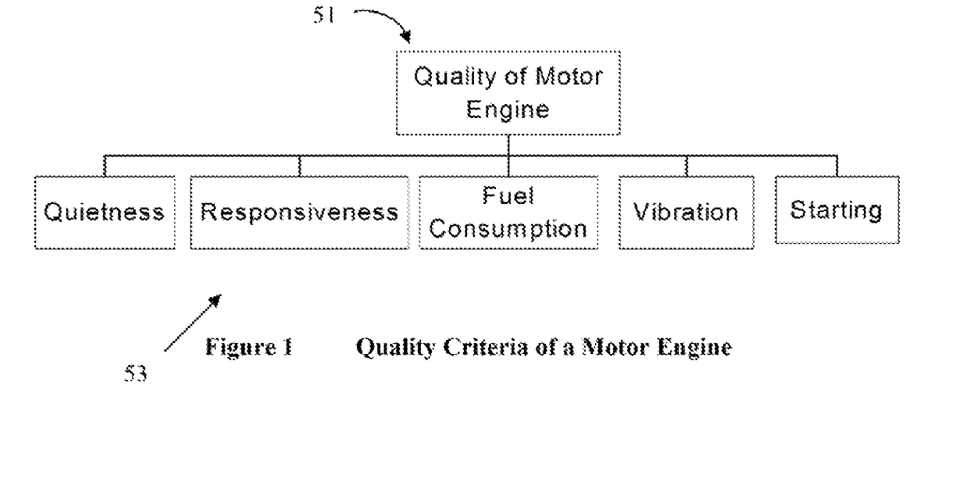
FIG. 1 is a schematic diagram illustrating a specific decision problem for a motor engine having a a hierarchy of five exemplary criteria (Quietness, Responsiveness, Fuel Consumption, Vibration and Starting)
Figure 2:
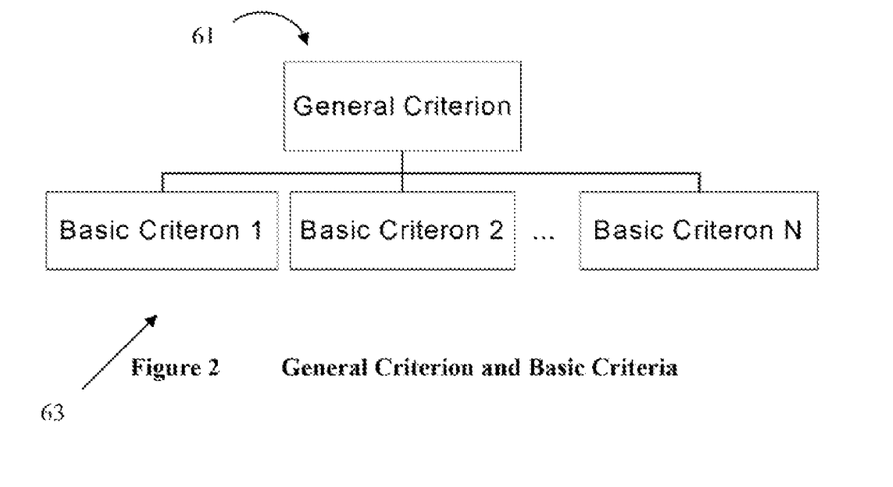
FIG. 2 is a schematic diagram of general and basic criteria illustrating a generic decision problem with a hierarchy of multiple criteria that a method according to an embodiment of the present invention can be used to solve.

Decision making with multiple criteria is based on the assessment of criteria. For instance, the quality of a motor engine 51 may not be properly assessed without taking into account relevant quality criteria 53 such as quietness, responsiveness, fuel consumption, vibration and starting, as shown in FIG. 1. Similar to the motor engine example, any general (upper-level) criterion 61 of an object can be assessed through its basic (lower-level) criteria 63, as shown in FIG. 2 or through a multi-level hierarchy of criteria.

Due to the subjective nature of the criterion, the quality of a motor engine can be expressed in the present invention using certain standards in terms of linguistic evaluation grades such as poor, indifferent, average, good and excellent. For example, the quality of an engine may be described using the following distribution, $$S(\text{Quality})=\{(\text{poor}, 0.01)\}, (\text{indifferent}, 0.14), (\text{average}, 0.15), (\text{good}, 0.63), (\text{excellent}, 0.05)\} \quad (1)$$

which reads that the quality of the engine is 1% poor, 14% indifferent, 15% average, 63% good, and 5% excellent. The distribution provides a panoramic view of the engine's quality as far as the quality criteria are concerned. The percentages in equation (1) are referred to as the degrees of believe to which the engine's quality is assessed to individual grades. For example, 63% good means that the quality of the engine is assessed to the grade "good" to a degree of 63%.

An assessment of quality is normally generated by aggregating more than one quality criterion. The quality criteria could be either quantitative or qualitative, and can be assessed in different ways. For instance, fuel consumption is a quantitative criterion and could be assessed using a quantity such as how many miles a motor vehicles can travel per gallon of fuel (mpg). On the other hand, it is more natural to assess a qualitative criterion using a set of grades appropriate for this criterion but not necessarily the same set as that used for assessing other criteria. In terms of quietness, for example, it is natural to judge that an engine is very quiet, quiet, normal, noisy or very noisy; in terms of vibration, it is common to judge that an engine vibrates heavily, normally or lightly.

To aggregate both quantitative and qualitative criteria, the relationships amongst various sets of grades have to be properly interpreted. For instance, the performance of a motor engine is said to be good if it is quiet, its responsiveness is good, its fuel consumption is low (39 mpg for example), its vibration is normal, and its starting is also good. In the above aggregation, it is implied that a quiet engine means that the quality of the engine is good as far as quietness is concerned. In other words, the grade quiet in the quietness assessment is equivalent to the grade good in quality assessment. Similarly, in the above aggregation if the fuel consumption of an engine is 39 mpg then its quality is judged to be good as far as fuel consumption is concerned.

In general, if both quantitative and qualitative criteria are included in a decision making problem it is necessary to transform various sets of assessment grades to a consistent framework so that they can be compared and aggregated consistently. In the following sections, techniques are exemplified which facilitate the transformation.

Rule-Based Quantitative Information Transformation

As discussed in the previous section, different linguistic evaluation grades may be used to describe the same standard. The equivalence between an evaluation grade and its corresponding standard can be established using equivalence rules to transform various sets of grades to a unified set. To transform quietness assessment to quality assessment, for example, the following simple equivalence rule could be established.

Suppose an evaluation grade "very noisy" in a quietness assessment is equivalent to a grade "poor" in a quality assessment, "noisy" equivalent to "indifferent", "normal" to "average", "quiet" to "good", and "very quiet" to "excellent". Then one could say that the set of grades {very noisy, noisy, normal, quiet, very quiet} in quietness assessment is equivalent to the set {poor, indifferent, average, good, excellent} in quality assessment.

The above equivalence is based on the fact that individual grades in the two sets are judged to be equivalent on the one-to-one basis. In the case of transforming vibration assessment (heavily, normally or lightly) to quality assessment, however, the grade "heavily" for vibration criterion may imply a "poor" grade of engine quality to a degree of 80% and an "indifferent" grade to 20%. In general, a grade for a basic criterion may imply several grades for a general criterion to certain degrees. Suppose:

$H_n$ is the $n^{th}$ grade for assessment of a general criterion,
$K_{m,i}$ is the $m^{th}$ grade for assessment of the $i^{th}$ basic criterion;
$\alpha_{n,m}$ is the degree to which $K_{m,i}$ implies $H_n$,
$\gamma_{m,i}$ is the degree to which the $i^{th}$ basic criterion is assessed to $K_{m,i}$; and
$\beta_{n,i}$ is the degree to which the $i^{th}$ basic criterion is assessed to $H_n$.

Then, an assessment $\{(K_{m,i}, \gamma_{m,i}), m=1, \ldots, M\}$ under a set of grades $\{K_{m,i}, m=1, \ldots, M\}$ can be equivalently transformed to an assessment $\{(H_n, \beta_{n,i}), n=1, \ldots, N\}$ under another set of grades $\{H_n, n=1, \ldots, N\}$ using the following matrix equation:

$$\begin{bmatrix} \beta_{1,i} \\ \beta_{2,i} \\ \vdots \\ \beta_{N,i} \end{bmatrix} = \begin{bmatrix} \alpha_{1,1} & \alpha_{1,2} & \cdots & \alpha_{1,M} \\ \alpha_{2,1} & \alpha_{2,2} & \cdots & \alpha_{2,M} \\ \vdots & \vdots & \ddots & \vdots \\ \alpha_{N,1} & \alpha_{N,2} & \cdots & \alpha_{N,M} \end{bmatrix} \begin{bmatrix} \gamma_{1,i} \\ \gamma_{1,i} \\ \vdots \\ \gamma_{M,i} \end{bmatrix} \quad (2)$$

The values of $\alpha_{n,m}$ (m=1, ..., M and n=1, ..., N) should satisfy the equation $$\sum_{n=1}^{N} \alpha_{n,m} = 1$$

and are determined by the following rules extracted from decision makers:

A grade $K_{m,i}$ implies
 a grade $H_1$ to a degree of $\alpha_{1,m}$,
 a grade $H_2$ to a degree of $\alpha_{2,m}$,
 ..., and
 a grade $H_N$ to a degree of $\alpha_{N,m}$,
 with m=1, ..., M.

Because the values of $\alpha_{n,m}$ (m=1, ..., M and n=1, ..., N) are determined using rules, this approach can be termed a rule-based information transformation technique.

Utility-Based Information Transformation

In the transformation technique described in the previous section it was assumed that the original assessment is equivalent to the transformed assessment in terms of value (also called utility) to decision makers, though the utilities of both assessments were not known explicitly. The utility of an assessment is given by the weighted sum of the utilities of grades using the degrees of belief as weights. The utility of a grade is a real number that is normally between 0 (the value for the most unfavorable grade) and 1 (the value for the most favorable grade). The utility of a grade represents a value of the grade to the decision maker. It is used to measure the decision maker's preferences towards a grade. Therefore, there is an element of subjectivity in utility estimation.

Suppose the utilities of all grades are already given by a decision maker for both sets of grades $\{K_{m,i}, m=1, \ldots, M\}$ and $\{H_n, n=1, \ldots, N\}$, denoted by $u(K_{m,i})$ and $u(H_n)$. Then, an assessment $\{(K_{m,i}, \gamma_{m,i}), m=1, \ldots, M\}$ under the set of grades $\{K_{m,i}, m=1, \ldots, M\}$ can be equivalently transformed to another assessment $\{(H_n, \beta_{n,i}), n=1, \ldots, N\}$ under the set of grades $\{H_n, n=1, \ldots, N\}$ using the following matrix equation:

$$\begin{bmatrix} \beta_{1,i} \\ \beta_{2,i} \\ \vdots \\ \beta_{N,i} \end{bmatrix} = \begin{bmatrix} \alpha_{1,1} & \alpha_{1,2} & \cdots & \alpha_{1,M} \\ \alpha_{2,1} & \alpha_{2,2} & \cdots & \alpha_{2,M} \\ \vdots & \vdots & \ddots & \vdots \\ \alpha_{N,1} & \alpha_{N,2} & \cdots & \alpha_{N,M} \end{bmatrix} \begin{bmatrix} \gamma_{1,i} \\ \gamma_{1,i} \\ \vdots \\ \gamma_{M,i} \end{bmatrix}, \text{ and}$$

where $$\alpha_{n,m} = \frac{u(H_{n+1}) - u(K_{m,i})}{u(H_{n+1}) - u(H_n)}, \alpha_{n+1,m} = 1 - \alpha_{n,m},$$

$\alpha_{1,m}=0 (i=1, \ldots, N, i \neq n, n+1)$, if $u(H_n) \leq u(K_{m,i}) \leq u(H_{n+1})$ for $n=, \ldots, N-1, \ldots, M$. (3)

If the utilities of both sets of grades are not given then they can be determined using the following equal distance scaling equations:

$$u(H_n) = \frac{n-1}{N-1}$$

for $n=1, \ldots, N$ if $H_{n+1}$ is preferred to $H_n$ (4)

$$u(K_{m,i}) = \frac{m-1}{M-1}$$

for $m=1, \ldots, M$ if $K_{n+1,i}$ is preferred to $K_{m,i}$ (5)

Quantitative Data Transformation

A quantitative criterion is assessed using numerical values initially. To aggregate a quantitative criterion together with other qualitative criteria, equivalence rules are extracted to transform a value to an equivalent distribution using belief degrees on the chosen set of grades. For instance, a fuel consumption of 50 mpg of a motor engine may mean that the quality of the engine is "excellent" as far as fuel consumption is concerned. In other words, the 50 mpg fuel consumption is equivalent to "excellent" engine quality as far as fuel consumption is concerned. Similarly, fuel consumptions of 44, 38, 32 and 25 mpg may be equivalent to "good" "average", "indifferent" and "poor", respectively. Any other numbers between 25 and 50 mpg can be made to be equivalent to a few grades with different degrees of belief. For example, fuel consumption of 42 mpg might be held to be equivalent to "good" to a degree of belief of 67% and "average" to a degree of belief of 33%.

In general, to assess a quantitative criterion, for example, the $i^{th}$ criterion, a set of grades $\{K_{m,i}, m=1, \ldots, M\}$ can be chosen which suits the criterion best, and then the assessment based on this set of grades transformed to an assessment based on another set of grades, for example the set of grades used to assess the general criterion associated with the quantitative criterion.

For any set of grades $\{K_{m,i}, m=1, \ldots, M\}$, a set of corresponding values $k_m$ ($m=1, \ldots, M$) can be found that the quantitative criterion may take so that $k_m$ is equivalent to the grade $K_{m,i}$, or $$k_m \text{ means } K_{m,i}(m=1,\ldots,M). \quad (6)$$

Without losing generality, one can even define a set of numerical grades $\{K_{m,i}, m=1, \ldots, M\}$ so that $K_{m,i}=k_m$ ($m=1, \ldots, M$), with $K_{M,i}$ being the most favourable feasible value of the criterion and $K_{1,i}$ the least. Suppose this is the case. Then any value $k_j$ ($K_{m,i} \leq k_j \leq K_{m+1,i}, m=1, \ldots, M-1$) of the $i^{th}$ criterion can be expressed as:

$$k_j = \sum_{m=1}^{M} (K_{m,i} s_{m,j}) \quad (7)$$

where $$s_{m,j} = \frac{K_{m+1,i} - k_j}{K_{m+1,i} - K_{m,i}}, \quad (8)$$

$$s_{m+1,j} = 1 - s_{m,j} \text{ if } K_{m,i} \leq k_j \leq K_{m+1,i}, m = 1, \ldots, M-1$$

$$s_{i,j} = 0 \text{ for } i = 1, \ldots, M; i \neq m, m+1$$

The assessment of $k_j$ in terms of the set of grades $\{K_{m,i}, m=1, \ldots, M\}$ can be expressed as:

$$\{(K_{m,i}, \gamma_{m,i}), m=1, \ldots, M\} \text{ with}$$

$$\gamma_{m,i} = S_{m,j}(m=1, \ldots, M). \quad (9)$$

In many decision situations, a quantitative criterion may be a random variable and take several values with different probabilities. Such assessment information can be expressed using a random number: $\{(k_j, p_j), j=1, \ldots, P\}$ where $k_j$ ($j=1, \ldots, P$) are possible values that the criterion may take, $p_j$ is the probability that the criterion may take a particular value $k_j$ and P is the number of possible values that the criterion may take. Using equations (7) and (8), $S_{m,j}$ ($m=1, \ldots, M$) can be calculated for each $k_j$ ($j=1, \ldots, P$). The random number $\{(k_j, p_j), j=1, \ldots, P\}$ can then be transformed to an assessment $\{(K_{m,i}, \gamma_{m,i}), m=1, \ldots, M\}$ under the set of grades $\{K_{m,i}, m=1, \ldots, M\}$ using the following matrix equation:

$$\begin{bmatrix} \gamma_{1,i} \\ \gamma_{2,i} \\ \vdots \\ \gamma_{M,i} \end{bmatrix} = \begin{bmatrix} s_{1,1} & s_{1,2} & \cdots & s_{1,P} \\ s_{1,1} & s_{1,2} & \cdots & s_{1,P} \\ \vdots & \vdots & \ddots & \vdots \\ s_{M,1} & s_{M,2} & \cdots & s_{M,P} \end{bmatrix} \begin{bmatrix} p_1 \\ p_2 \\ \vdots \\ p_P \end{bmatrix}. \quad (10)$$

When the quantitative criterion takes a deterministic number, such as $k_j$, then $p_j=1$ and $p_i=0$ for $i=1, \ldots, M$ and $i \neq j$ in equation (10). That is, for a deterministic value, equation (10) becomes:

$$\begin{bmatrix} \gamma_{1,i} \\ \gamma_{2,i} \\ \vdots \\ \gamma_{M,i} \end{bmatrix} = \begin{bmatrix} s_{1,j} \\ s_{2,j} \\ \vdots \\ s_{M,j} \end{bmatrix}. \quad (11)$$

This is equivalent to equation (9). This is the special feature of a deterministic criterion, and the analysis conforms to the previous analysis.

In order to aggregate the basic quantitative criterion with other basic criteria, it is necessary to transform the assessment results $\{(K_{m,i}, \gamma_{m,i}), m=1, \ldots, M\}$ under the set of grades $\{K_{m,i}, m=1, \ldots, M\}$ to $\{(H_n, \beta_{n,i}), n=1, \ldots, N\}$ under the set of grades $\{H_n, n=1, \ldots, N\}$ of the general criterion. We can use equation (2) to perform the transformation. Combining equation (2) with equation (10), we can transform a deterministic number $k_j$ or a random number $\{(k_j, p_j), j=1, \ldots, P\}$ to $\{(H_n, \beta_{n,i}), n=1, \ldots, N\}$ using the following equation:

$$\begin{bmatrix} \beta_{1,i} \\ \beta_{2,i} \\ \vdots \\ \beta_{N,i} \end{bmatrix} = \begin{bmatrix} \alpha_{1,1} & \alpha_{1,2} & \cdots & \alpha_{1,M} \\ \alpha_{2,1} & \alpha_{2,2} & \cdots & \alpha_{2,M} \\ \vdots & \vdots & \ddots & \vdots \\ \alpha_{N,1} & \alpha_{N,2} & \cdots & \alpha_{N,M} \end{bmatrix} \begin{bmatrix} s_{1,1} & s_{1,2} & \cdots & s_{1,P} \\ s_{2,1} & s_{2,2} & \cdots & s_{2,P} \\ \vdots & \vdots & \ddots & \vdots \\ s_{M,1} & s_{M,2} & \cdots & s_{M,P} \end{bmatrix} \begin{bmatrix} p_1 \\ p_2 \\ \vdots \\ p_P \end{bmatrix}. \quad (12)$$

Dealing With Incomplete Information

Following appropriate transformations, all criteria can be described in the same framework. Using the techniques described in the previous sections, it is possible to do so even if the criteria comprise quantitative and qualitative criteria, and if the quantitative criteria take random or precise numbers. An example of such an instance is the assessment of quality criteria of a motor engine using the following distributions under the same set of grades:

S[quietness]={[good, 0.5], [excellent, 0.3]},
S[responsiveness]={[good, 1.0]},
S[fuel economy]={[indifferent, 0.5], [average, 0.5]},
S[vibration]={[good, 0.5], [excellent, 0.5]}, and
S[starting]={[good, 1.0]}.

In an ideal situation, the quality of an engine will be regarded as good if its responsiveness, fuel economy, quietness, vibration and starting are all assessed to be exactly good. However, such consensus assessments are rare, and criteria are often assessed to different evaluation grades, as shown in the above example. A further problem is that an assessment may not be complete. For example, the assessment for quietness is not complete as the total degree of belief in the assessment is 0.5+0.3=0.8. In other words, 20% of the belief degrees in the assessment are missing.

To judge the quality of an engine and compare it with other engines, a question is how to generate a quality assessment for the engine by aggregating the various assessments of the quality criteria as given above, which could be incomplete. This question is common to most MCDA problems. The present invention provides a systematic and rational way of dealing with the aggregation problem.

Generate Basic Probability Masses

In the engine quality assessment problem, each quality criterion plays a part in the assessment but no single criterion dominates the assessment. In other words, the quality criteria are of relative importance. This is true of any MCDA problem.

Weights for each of the basic criteria $W_i$ (i=1, ..., L) should reflect the relative importance of each basic criterion to the general criterion. They can be assigned using a few methods such as a method based on pairwise comparisons or simply according to the decision maker's judgement. For example, if the decision maker thinks that basic criterion 1 is twice as important as basic criterion 2, then he or she may assign $\{W_1=10, W_2=5\}$ or $\{W_1=2, W_2=1\}$ as long as they are relatively correct.

The weights assigned by the decision maker need to be normalized to arrive at a set of normalized weights $\omega_i$ (i=1, ..., L) using the following equation:

$$\omega_i = \frac{W_i}{\sum_{j=1}^{L} W_j} \quad (i = 1, \ldots, L), \tag{13}$$

so that $0 \leq \omega_i \leq 1$, and $$\sum_{i=1}^{L} \omega_i = 1. \tag{14}$$

Embodiments of the present invention use a new evidential reasoning algorithm for criteria aggregation, which operates on probability masses as described in the following sections. Since criteria are of relative importance, the assessment of one criterion to a grade to certain degree does not necessarily mean that all criteria would be assessed to the grade to the same degree. For instance, if the quietness of an engine is assessed to be good to a degree of 50%, the quality of the engine would not necessarily be assessed to be good to the same degree. This is because the engine quality is also determined by the other four quality criteria.

According to an embodiment of the present invention, the definition of a basic probability mass takes into account the relative importance of criteria. Let $\beta_{n,i}$ denote a degree of belief that the $i^{th}$ basic criterion is assessed to a grade $H_n$. Let $m_{n,i}$ be a basic probability mass representing the degree to which the $i^{th}$ basic criterion (quality criterion) supports the hypothesis that the general criterion (quality) is assessed to the $n^{th}$ grade $H_n$. Let H denote the whole set of grades, or $H=\{H_n, n=1, \ldots, N\}$. $m_{n,i}$ is then defined as the weighted degree of belief or probability mass as shown in equation (15). Let $m_{H,i}$ be a remaining probability mass unassigned to any individual grade after the $i^{th}$ basic criterion has been assessed. Then, $m_{n,i}$ and $m_{H,i}$ are given by:

$$m_{n,i} = \omega_i \beta_{n,i} \quad n = 1, \ldots, N, \tag{15}$$

$$m_{H,i} = 1 - \sum_{n=1}^{N} m_{n,i} = 1 - \omega_i \sum_{n=1}^{N} \beta_{n,i}, \tag{16}$$

$m_{H,i}$ is decomposed into two parts: $\overline{m}_{H,i}$ and $\tilde{m}_{H,i}$ with $m_{H,i} = \overline{m}_{H,i} + \tilde{m}_{H,i}$, where $$\overline{m}_{H,i} = 1 - \omega_i \text{ and } \tilde{m}_{H,i} = \omega_i \left(1 - \sum_{n=1}^{N} \beta_{n,i}\right). \tag{17}$$

$\overline{m}_{H,i}$ is the first part of the remaining probability mass that is not yet assigned to individual grades due to the fact that criterion i only plays one part in the assessment relative to its weight. In other words, $\overline{m}_{H,i}$ provides the scope where other criteria can play a role in the assessment. $\overline{m}_{H,i}$ will eventually be assigned to individual grades in a way that is dependent upon how all criteria are assessed and weighted. $\tilde{m}_{H,i}$ is the second part of the remaining probability mass that is not assigned to individual grades due to the incompleteness in an assessment. $\tilde{m}_{H,i}$ is proportional to $\omega_i$ and will cause the subsequent assessments to be incomplete.

Combine Probability Masses

In equations (15) to (17), the contribution of the $i^{th}$ basic criterion 63 to the assessment of the general criterion 61 (see FIG. 2) is represented as the basic probability masses. A new algorithm is developed to aggregate the basic probability masses. An important feature of the algorithm is its capacity of handling incomplete assessments by providing the upper and lower bounds of probability masses, based upon which the range of combined assessments can be generated, as discussed in the following sections.

Let $I_{n,i}$ (n=1,2, ..., N), $\overline{I}_{H,i}$ and $\tilde{I}_{H,i}$ denote the combined probability masses generated by aggregating the first i criteria. The following algorithm can be used to combine the first i criteria with the $(i+1)^{th}$ criterion in a recursive manner:

$$I_{n,1} = m_{n,1} \quad (n = 1, 2, \ldots, N) \tag{18a}$$

$$I_{H,1} = m_{H,1} \tag{18b}$$

$$\tilde{I}_{H,1} = \tilde{m}_{H,1} \tag{18c}$$

$$\overline{I}_{H,1} = \overline{m}_{H,1} \tag{18d}$$

$$K_{i+1} = \left[1 - \sum_{t=1}^{N} \sum_{\substack{j=1 \\ j \neq t}}^{N} I_{t,i} m_{j,i+1}\right]^{-1} \tag{18e}$$

$$I_{n,i+1} = \tag{18f}$$
$$K_{i+1}[I_{n,i}m_{n,i+1} + I_{H,i}m_{n,i+1} + I_{n,i}m_{H,i+1}](n = 1, \ldots, N)$$

$$\tilde{I}_{H,i+1} = K_{i+1}[\tilde{I}_{H,i}\tilde{m}_{H,i+1} + \tilde{I}_{H,i}\overline{m}_{H,i+1} + \overline{I}_{H,i}\tilde{m}_{H,i+1}] \tag{18g}$$

$$\overline{I}_{H,i+1} = K_{i+1}[\overline{I}_{H,i}\overline{m}_{H,i+1}] \tag{18h}$$

$$I_{H,i+1} = \overline{I}_{H,i+1} + \tilde{I}_{H,i+1} \quad i = \{1, 2, \ldots, L-1\}, \tag{18i}$$

wherein $I_{n,L}$ is the combined probability mass assigned to the $n^{th}$ grade (n=1, ..., N), $\overline{I}_{H,L}$ the combined probability that needs to be redistributed over the N grades, and $\tilde{I}_{H,L}$ the remaining combined probability mass that is unable to be distributed to any specific grade due to insufficient information, and $I_{H,L} = \overline{I}_{H,L} + \tilde{I}_{H,L}$.

Generate Combined Decrees of Belief

After all L basic criteria have been aggregated, the overall combined probability masses are given by $I_{n,L}$ (n=1,2, ..., N), $\overline{I}_{H,L}$ and $\tilde{I}_{H,L}$. $\overline{I}_{H,L}$ denotes the remaining probability mass that can be assigned to individual grades. In the present invention, it is assigned to all individual grades proportionally using the following normalization process so as to generate the combined degrees of belief to the grade $H_n$.

$$\beta_n = \frac{I_{n,L}}{1 - \tilde{I}_{H,L}} \quad n = 1, 2, \ldots, N. \tag{19a}$$

The degree of belief that is not assigned to any individual grades is assigned to the whole set H by:

$$\beta_H = \frac{\tilde{I}_{H,L}}{1 - \tilde{I}_{H,L}}. \tag{19b}$$

It has been proven that the combined degrees of belief generated using the above normalization process satisfy the common sense synthesis rules (CSSR)♣ in MCDA whilst incompleteness in original assessments is preserved and represented by $\beta_H$. The generated assessment for a general criterion can be represented by a distribution $\{(H_n, \beta_n), n=1, \ldots, N\}$, which reads that the general criterion is assessed to the grade $H_n$ with the degree of belief $\beta_n (n=1, \ldots, N)$.

♣CSSR 1: If no basic criterion is assessed to an evaluation grade at all then the general criterion should not be assessed to the same grade either.

CSSR 2: If all basic criteria are precisely assessed to an individual grade, then the general criterion should also be precisely assessed to the same grade.

CSSR 3: If all basic criteria are completely assessed to a subset of grades, then the general criterion should be completely assessed to the same subset as well.

CSSR 4: If basic assessments are incomplete, then a general assessment obtained by aggregating the incomplete basic assessments should also be incomplete with the degree of incompleteness properly expressed.

Generate a Utility Interval

There may be occasions where distributed descriptions are not directly comparable to show the difference between two assessments. In such circumstances, it is desirable to generate numerical values equivalent to the distributed assessments in some sense. The present invention introduces the concept of expected utility to define such a value. Suppose $u(H_n)$ is the utility of the grade $H_n$ with $u(H_{n+1}) > u(H_n)$ if $H_{n+1}$ is preferred to $H_n$. If all assessments are complete and precise, then $\beta_H = 0$ and the expected utility which is calculated by $$u = \sum_{n=1}^{N} \beta_n u(H_n)$$

can be used for ranking alternatives.

Note that $\beta_H$ given in Equation (19b) is the unassigned degree of belief representing the extent of the incompleteness (ignorance) in the overall assessment. Within the evaluation framework discussed in the previous sections, $\beta_n$ provides the lower bound of the likelihood to which $H_n$ is assessed to. The upper bound of the likelihood is given by a belief degree of $(\beta_n + \beta_H)$. Thus the belief interval $[\beta_n, (\beta_n + \beta_H)]$ provides the range of the likelihood that $H_n$ may be assessed to. The interval will reduce to a point $\beta_n$ if all basic assessments are complete (or $\beta_H = 0$).

If any basic assessment is incomplete, the likelihood to which $H_n$ may be assessed to is not unique and can be anything in the interval $[\beta_n, (\beta_n + \beta_H)]$. In such circumstances, three values are defined to characterise a distributed assessment, namely the minimum, maximum and average utilities. Without loss of generality, suppose $H_1$ is the least preferred grade having the lowest utility and $H_N$ the most preferred grade having the highest utility. Then the maximum, minimum and average utilities are given by $$u_{\max} = \sum_{n=1}^{N-1} \beta_n u(H_n) + (\beta_N + \beta_H) u(H_N) \quad (20)$$

$$u_{\min} = (\beta_1 + \beta_H) u(H_1) + \sum_{n=2}^{N} \beta_n u(H_n) \quad (21)$$

$$u_{avg} = \frac{u_{\max} + u_{\min}}{2} \quad (22)$$

wherein $u_{max}$, $u_{min}$, and $u_{avg}$ are the best possible, worst possible and average performance indicators in terms of utility values respectively, and $u(H_n)(n=1, \ldots, N)$ are the utility values of the grade $H_n (n=1, \ldots, N)$ as mentioned previously.

The present invention includes within its scope computer programs which perform the above described methods, carrier media storing said computer programs, and computers which are adapted to perform the above described methods. Typically, a computer would be adapted to perform the methods of the invention by virtue of running computer programs of the present invention. Suitable carrier media include, but are not limited to, hard discs, floppy discs, compact discs, tapes, DVD and memory devices such as PROMs and EEPROMs. Computer programs, such as an embodiment which is exemplified below, can allow users to enter the transformation rules, to define assessment grades, to conduct evidence mapping processes and to aggregate multiple criteria using the ER algorithm. Additionally, the computer program can provide a graphical display of the results of an assessment. Computer programs can be provided which interface with commercially available operating systems or specific programs. The skilled reader will readily appreciate how such interfacing can be achieved.

EXAMPLE

Assessment Criteria

Figure 3:
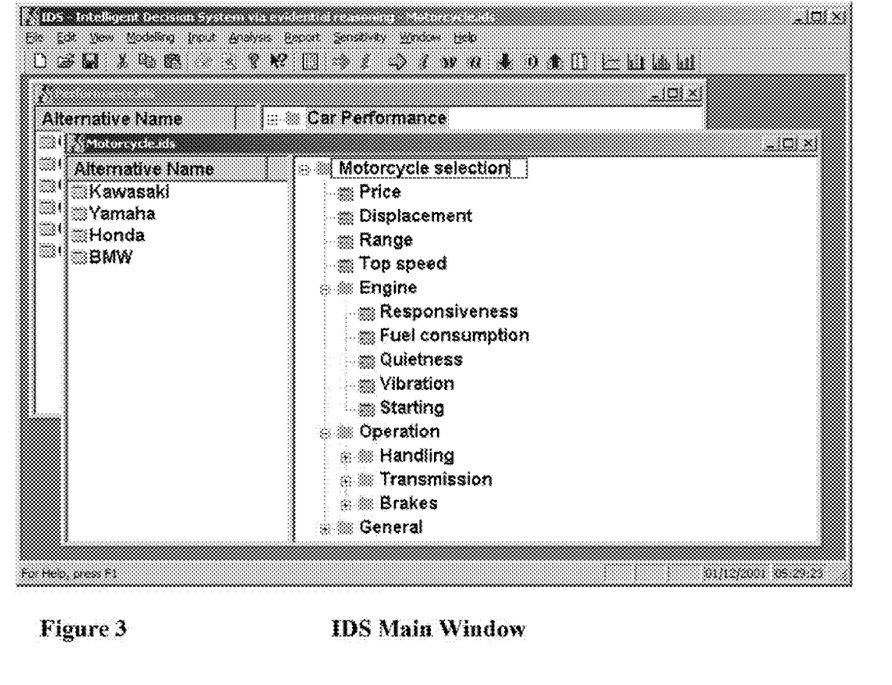
FIG. 3 shows a main window produced by an exemplary computer program illustrating computer implementation of a step of assessing many entities such as four motorcycles (Kawasaki, Yamaha, Honda and MBW) based on many basic criteria (Price, Displacement, Range, etc) according to an embodiment of the present invention.

In this example a motorcycle assessment problem is examined using both complete and incomplete (imprecise) data of both a quantitative and qualitative nature. The belief structure will be used to facilitate continuous and imprecise assessments for qualitative criteria. For quantitative criteria, both certain and random numbers are taken into account. The transformation techniques are used to transform the various types of information into a unified framework. Software is used to support the analysis. The main window of the display produced by the software is shown in FIG. 3 for the motorcycle selection problem.

The assessment problem has seven main criteria: Price, Displacement, Range, Top speed, Engine quality; Operation system and General finish. The first four criteria are quantitative and are measured using the following different units: pound sterling, cc, miles and mph, respectively.

The last three criteria are qualitative and difficult to measure directly. Therefore they are assessed through detailed sub-criteria. For example, engine quality is assessed through responsiveness, fuel consumption, quietness, vibration and starting; general finish through quality of finish, seat comfort, headlight, mirrors and horns. Operation system can be assessed through handling, transmission and brakes, which however are still difficult to assess directly and therefore are evaluated through more detailed sub-sub criteria. For example, handling is assessed through steering, bumpy bends, manoeuvrability and top speed stability; transmission through clutch operation and gearbox operation; and brakes through stopping power, braking stability and feel at control.

Input Information

Table 4 describes the motorcycle assessment problem, which involves four candidate motorcycles for assessment based on 29 criteria of a hierarchy as described in the previous section. The input information includes the relative weights among groups of criteria and the assessment outcome of each motorcycle on every criterion. The relative weights of the same group of criteria are shown in the brackets. Outcomes include precise numbers, random numbers and subjective assessments.

Figure 4:
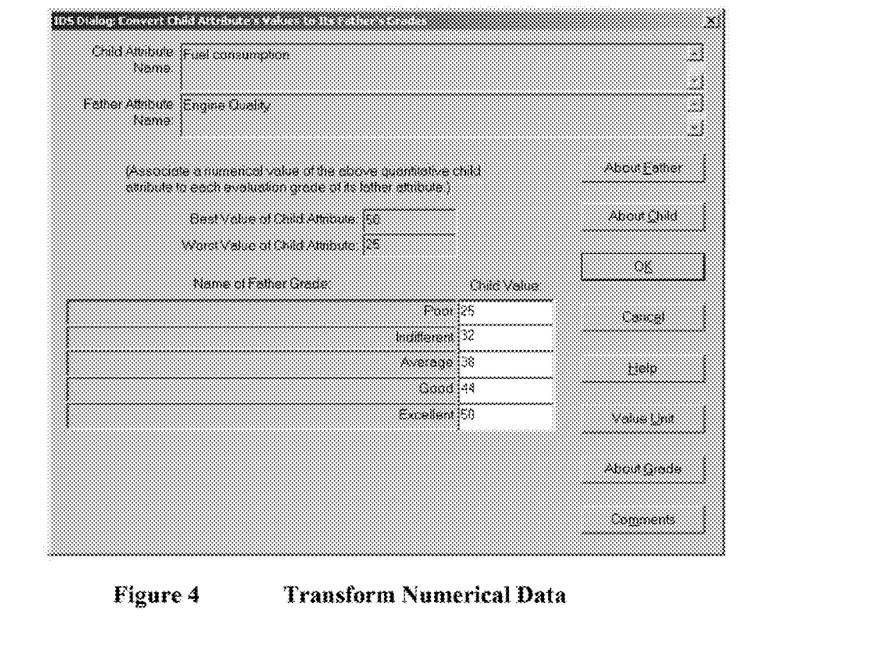
FIG. 4 shows a software driven interface for implementing a rule based on a quantitative data transformation technique according to an embodiment of the present invention.

Price, Displacement, Range and Top speed are all assessed using precise numbers. For examples, the price, displacement, range and top speed of Honda are given by £6199, 998 cc, 170 miles and 160 mph, respectively. Fuel consumption varies in different weather and road conditions. For example, fuel consumption is assessed on four conditions: (1) winter & urban, (2) winter & suburb, (3) summer & urban and (4) summer & suburb as well as the frequencies that a motorcycle is used in these conditions. For example, the fuel consumption of Honda is 31 mpg, 35 mpg, 39 mpg and 43 mpg under these four conditions with the equal frequency of 25% recorded by {[31, 0.25], [35, 0.25], [39, 0.25], [43, 0.25]}. Quantitative numbers can be transformed to qualitative assessments using the techniques described previously. FIG. 4 shows an interface for implementing the rule-based data transformation technique which is supported by the software.

Figure 5:
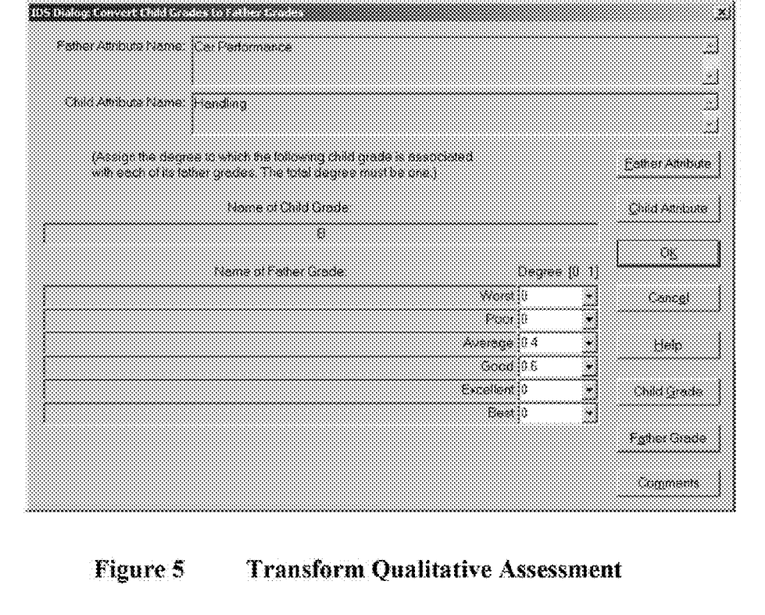
FIG. 5 shows a software driven interface for implementing a rule based on another qualitative information transformation technique according to an embodiment of the present invention.
Figure 6:
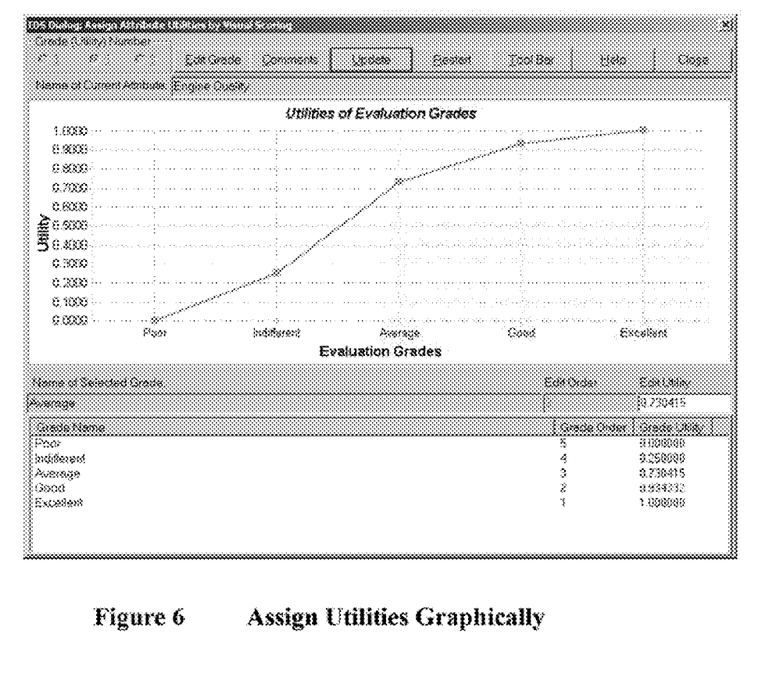
FIG. 6 shows a software driven interface which supports utility estimation according to an embodiment of the present invention.
Figure 7:
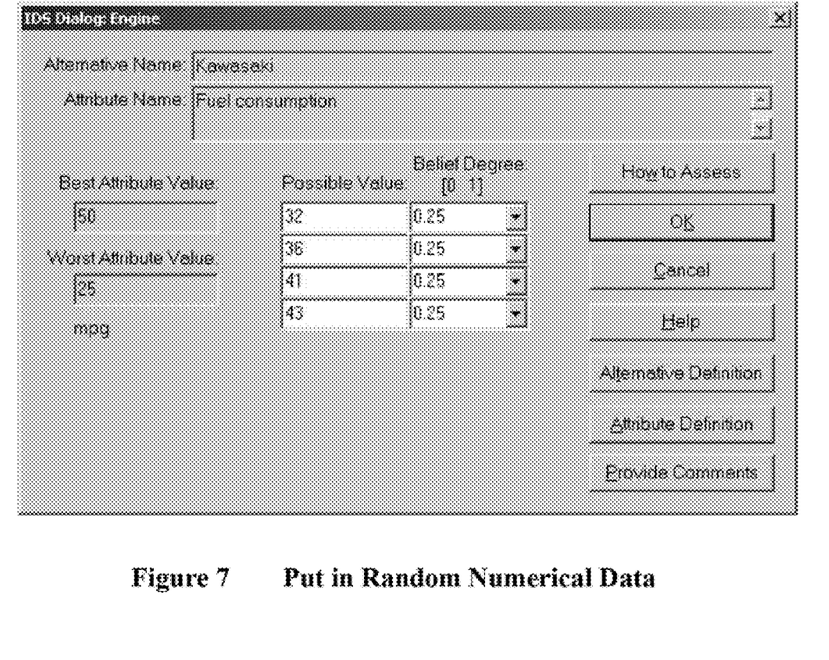
FIG. 7 shows a software driven interface which enables random numerical data to be inputted and used according to an embodiment of the present invention.
Figure 8:
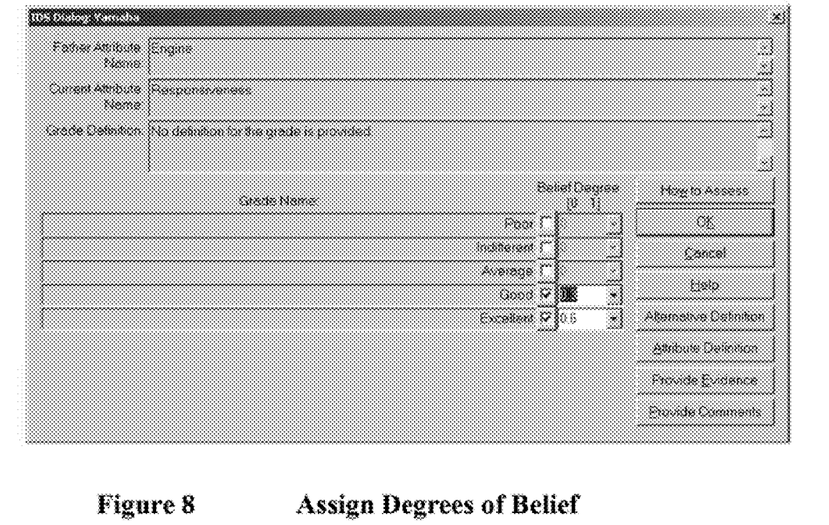
FIG. 8 shows a software driven interface which permits a user to assign degrees of belief according to an embodiment of the present invention.

For simplicity, the qualitative criteria in this example are all assessed using the same five evaluation grades, which are defined as Poor ($H_1$), Indifferent ($H_2$), Average ($H_3$), Good ($H_4$) and Excellent ($H_5$) and abbreviated by P, I, A, G and E respectively. The overall assessment of a motorcycle is also based on this set of grades. For example, the responsiveness of Yamaha is assessed to 30% good, and 60% excellent, denoted by {[G, 0.3], [E, 0.6]}. If different sets of grades are used for lower-level criteria, the rule or utility-based techniques described in the previous sections can be used to transform them to the same set of grades. FIG. 5 shows an interface for implementing the rule-based qualitative information transformation technique. The utility-based information transformation techniques are implemented in the software by estimating the utilities of grades. FIG. 6 shows an interface to support utility estimation.

Imprecise assessments are lightly shaded in Table 4 and data absence is also assumed, as shown by the shaded blank boxes. Some judgements and random numbers are incomplete in the sense that the total degree of belief in an assessment is not summed to unity. For example, the assessment of the responsiveness of Yamaha is {[G, 0.3], [E, 0.6]} where the total belief degree is (0.3+0.6)<1 (or 30%+60%<100%). The assessment for the fuel consumption of Yamaha is {[28, 0.25], [34, 0.25], [38, 0.25]} with the total belief degree of 0.75[or 75%], since the fuel consumption data in urban areas in winter are not available. All input information, either quantitative or qualitative, can be fed into software using its input dialogue windows such as those shown in FIGS. 7 and 8.

TABLE 4

Assessment Data for Motorcycle Selection Problem

| Attribute | | | Kawasaki | Yamaha | Honda | BMW |
|---|---|---|---|---|---|---|
| Price, pounds (9) | | | 6499 | 5199 | 6199 | 8220 |
| Displacement, cc (5) | | | 1052 | 1188 | 998 | 987 |
| Range miles (7) | | | 175 | 160 | 170 | 200 |
| Top speed mph (7) | | | 160 | 155 | 160 | 145 |
| Engine (14) | responsiveness (0.2) | | {[E, 0.8]} | {[G, 0.3], [E, 0.6]} | {[G, 1.0]} | {[I, 1.0]} |
| | fuel consumption, mpg (0.4) | | {[32, 0.25], [36, 0.25], [41, 0.25] [43, 0.25]} | {[28, 0.250], [34, 0.25], [38, 0.25]} | {[31, 0.25], [35, 0.25], [39, 0.25], [43, 0.25]} | {[35, 0.25], [39, 0.25], [46, 0.25], [48, 0.25]} |
| | quietness (0.1) | | {[I, 0.5], [A, 0.5]} | {[A, 1.0]} | {[G, 0.5], [E, 0.3]} | |
| | vibration (0.1) | | {[G, 1.0]} | {[I, 1.0]} | {[G, 0.5], [E, 0.3]} | {[P, 1.0]} |
| | starting (0.2) | | {[G, 1.0]} | {[A, 0.6], [G, 0.3]} | {[G, 1.0]} | {[A, 1.0]} |
| Operation (7) | Handling (0.5) | Steering (0.3) | {[E, 0.9]} | {[G, 1.0]} | {[A, 1.0]} | {[A, 0.6]} |
| | | Bumpy Bends (0.1) | {[A, 0.5], [G, 0.5]} | {[G, 1.0]} | {[G, 0.8], [E, 0.1]} | {[P, 0.5], [I, 0.5]} |
| | | Manoeuvrability (0.4) | {[A, 1.0]} | {[E, 0.9]} | | {[P, 1.0]} |
| | | Top speed stability (0.3) | {[E, 1.0]} | {[G, 1.0]} | {[G, 1.0]} | {[G, 0.6], [E, 0.4]} |
| | Transmission (0.167) | Clutch Operation (0.5) | {[A, 0.8]} | {[G, 1.0]} | {[E, 0.85]} | {[I, 0.2], [A, 0.8]} |
| | | Gearbox Operation (0.5) | {[A, 0.5], [G, 0.5]} | {[I, 0.5], [A, 0.5]} | {[E, 1.0]} | {[P, 1.0]} |
| | Brakes (0.333) | Stopping Power (0.4) | {[G, 1.0]} | {[A, 0.3], [G, 0.6]} | {[G, 1.0]} | |
| | | Braking Stability (0.3) | {[G, 0.5], [E, 0.5]} | {[G, 1.0]} | {[A, 0.5], [G, 0.5]} | {[E, 1.0]} |
| | | Feel at control (0.3) | {[P, 1.0]} | {[G, 0.5], [E, 0.5]} | {[G, 1.0]} | {[G, 0.5], [E, 0.5]} |
| General (14) | Quality of Finish (0.4) | | {[P, 0.5], [I, 0.5]} | {[G, 1.0]} | {[E, 1.0]} | {[G, 0.5], [E, 0.5]} |
| | Seat comfort (0.3) | | {[G, 1.0]} | {[G, 0.5], [E, 0.5]} | {[G, 1.0]} | {[E, 1.0]} |
| | Headlight (0.1) | | {[G, 1.0]} | {[A, 1.0]} | {[E, 1.0]} | {[G, 0.5], [E, 0.5]} |
| | Mirrors (0.1) | | {[A, 0.5], [G, 0.5]} | {[G, 0.5], [E, 0.5]} | {[E, 1.0]} | {[G, 1.0]} |
| | Horn (0.1) | | | {[G, 1.0]} | {[G, 0.5], [B, 0.5]} | {[E, 1.0]} |

If traditional MCDA methods were applied to the above problem, then at best one would have to make efforts to try to find the missing information and eliminate the imprecision. This is assuming that such efforts are practical and cost effective. Otherwise, additional assumptions need to be made about these missing and imprecise assessments, or certain criteria have to be abandoned for further analysis. In either event, the outcome is less than satisfactory. In contrast, the present invention is well suited to solving the problem using the very information of Table 4. The software may be used to support the following analysis.

Ranking and Results

The present invention can operate on degrees of belief. To generate utility intervals, it is necessary to estimate the utilities of values and grades. The certain monetary equivalent (CME) approach can be used to estimate the utilities of quantitative criteria. Take price for example. Suppose for this range of motorcycles the highest acceptable price is "£9,000" and the lowest possible price is "£5,000". Note that the price is a cost criteria and therefore low price is preferred. First of all, the utility of price is normalized by assigning u(9000)=0 and u(5000)=1.

Following the procedure of the CME approach, a price value having the average utility of £9,000 and £5,000 is identified first. Suppose the price value is £7,500. Thus u(7500)=(u(9000)+u(5000))/2=0.5. Furthermore, suppose £6,500 has the average utility of £7,500 and £5,000, or u(6500)=(u(7500)+u(5000))/2=0.75, and £8,500 has the average utility of £9,000 and £7,500, or u(8500)=(u(9000)+u(7500))/2=0.25. Let $K_{1,1}$=9000, $K_{2,1}$=8500, $K_{3,1}$=7500, $K_{4,1}$=6500, $K_{5,1}$=5000. Note that if no preference information is available then a linear marginal utility function could be assumed for price. Under this assumption there would be $\overline{K}_{1,1}$=9000, $\overline{K}_{2,1}$=8000, $\overline{K}_{3,1}$=7000, $\overline{K}_{4,1}$=6000, and $\overline{K}_{5,1}$=5000.

The probability assignment approach could be used to estimate the utilities of the five evaluation grades for the qualitative attributes. To illustrate the process and simplify discussion, suppose the utility of the five evaluation grades are equidistantly distributed in the normalized utility space, or u(P)=0, u(I)=0.25, u(A)=0.5, u(G)=0.75, u(E)=1.

Figure 9:
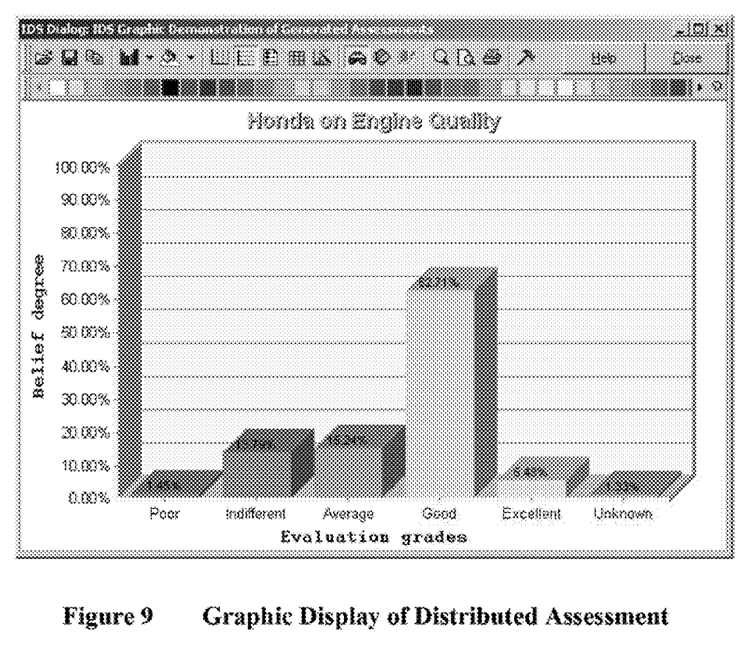
FIG. 9 shows a graphical display of a distributed assessment according to an embodiment of the present invention.
Figure 10:
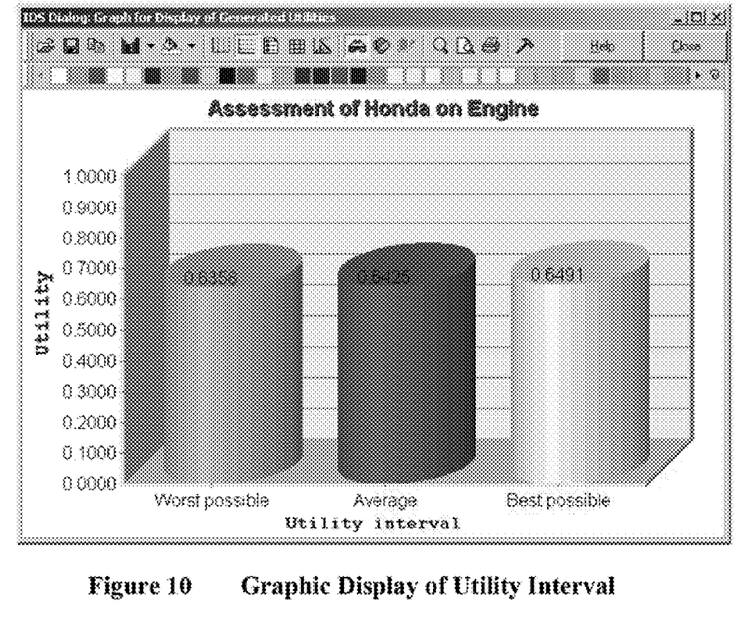
FIG. 10 shows a graphical display of utility intervals according to an embodiment of the present invention.

In Table 4, the criteria are of a three-level hierarchy. In the present example, each group of the bottom level criteria associated with the same upper-level criterion are first aggregated to generate an assessment for the upper-level criterion. Once the assessments for a group of upper-level criteria associated with the same higher-level criterion are all generated, these assessments can be further aggregated in the same fashion to generate an assessment for the higher-level criterion. This hierarchical aggregation process is based on the techniques previously described herein, and implemented in the software. The assessment of each motorcycle on any criterion can be reported graphically in the software, as shown in FIGS. 9 and 10, which display data concerning the quality of the Honda engine. Table 5 shows the final assessments generated using the software for the four motorcycles by aggregating all the criteria shown in Table 4. The comparison and ranking of the four motorcycles on the overall criterion and other selected criteria can be reported graphically as shown in FIGS. 11 and 12.

The above results show that Honda is clearly the most recommended motorcycle as its minimum utility is larger than the maximum utilities of the other motorcycles. This is logical as it has the best engine quality, excellent general finish and relatively low price. Yamaha is ranked the second due to its low price followed by Kawasaki. BMW is ranked the last due to its high price and below average transmission and handling system. The above ranking is conclusive for the weights provided despite the imprecision and absence of some data. This shows that decision could be made on the basis of incomplete information. Note, however, that the above ranking is the personal choice of the decision maker who provided the weights of all the criteria and also estimated their marginal utilities. This means that given the same assessment data shown in Table 4, another decision make may achieve a different ranking.

TABLE 5

Overall Assessment of Motorcycles

| Assessment | Kawasaki | Yamaha | Honda | BMW |
|---|---|---|---|---|
| Distributed assessment | {[P, 0.0515], [I, 0.0858], [A, 0.2147], [G, 0.5693], [E, 0.0572]} | {[P, 0.0455], [I, 0.1153], [A, 0.2106], [G, 0.3232], [E, 0.2745]} | {[P, 0.003], [I, 0.0782], [A, 0.1646], [G, 0.5374], [E, 0.2010]} | {[P, 0.0888], [I, 0.2499], [A, 0.1904], [G, 0.1155], [E, 0.3288]} |
| Maximum utility | 0.6345 | 0.6820 | 0.7217 | 0.5996 |
| Minimum utility | 0.6130 | 0.6511 | 0.7059 | 0.5864 |
| Average utility | 0.6237 | 0.6665 | 0.7138 | 0.5732 |
| Ranking | 3 | 2 | 1 | 4 |

It will be appreciated that this assessment is for exemplary purposes only, and that the invention is not limited in its scope by the specific disclosures of the example.

What is claimed is:

1. A computer implemented multiple criteria decision analysis method in which a plurality of L basic criteria of one or more entities are assessed so as to generate an assessment of the one or more entities in which the assessments of each entity on the plurality of L basic criteria expressed as $\{(H_n, \beta_{n,i}), n=1, \ldots, N\}$ for i=$\{1, \ldots, L\}$ are aggregated in order to generate an overall assessment for the entity on a general criterion, the method comprising the steps of:

i) assigning weights $W_i$ (i=1, ..., L) to each of the L basic criteria according to a relative importance determined by a decision maker of the basic criteria to the general criterion;

ii) calculating by a computer a set of normalized weights $\omega_i$ using the following equation:

$$\omega_i = \frac{W_i}{\sum_{j=1}^{L} W_j} (i = 1, \ldots L);$$

iii) calculating by the computer weighted degrees of belief defining basic probability mass $m_{n,i}$, using the following equation:

$$m_{n,i} = \omega_i \beta_{n,i}, (n=1, \ldots, N; i=1, \ldots, L),$$

where $\beta_{n,i}$ is the degree to which the $i^{th}$ basic criterion is assessed to $H_n$, $H_n$ is the $n^{th}$ grade for assessment of the general criterion, the general criterion being assessed to N grades, and $m_{n,i}$ represents the degree to which the $i^{th}$ basic criterion supports a hypothesis that the general criterion is assessed to the $n^{th}$ grade of $H_n$;

iv) calculating by the computer a remaining probability mass $m_{H,i}$ using the following equation:

$$m_{H,i} = 1 - \sum_{n=1}^{N} m_{n,i}, (i = 1, \ldots, L);$$

v) displaying on a computer-generated graphical user interface comparative results of the overall assessment to thereby enhance entity evaluation;

vi) decomposing $m_{H,i}$ into $\overline{m}_{H,i}$ and $\tilde{m}_{H,i}$, wherein:

$$m_{H,i} = \overline{m}_{H,i} + \tilde{m}_{H,i},$$

$$\overline{m}_{H,i} = 1 - \omega_i, \text{ and}$$

$$\tilde{m}_{H,i} = \omega_i \left(1 - \sum_{n=1}^{N} \beta_{n,i}\right) \text{ for } i = 1, \ldots, L;$$

vii) aggregating $m_{n,i}, \overline{m}_{H,i}$ and $\tilde{m}_{H,i}$ ($i=1, \ldots, L$) into combined probability masses $I_{n,L}, \overline{I}_{H,L}$ and $\tilde{I}_{H,L}$, respectively, using the following equations 1) to 9) in a recursive manner, where:

$$I_{n,1} = m_{n,1} - (n = 1, 2, \ldots, N), \quad 1)$$

$$I_{H,1} = m_{H,1}, \quad 2)$$

$$\tilde{I}_{H,1} = \tilde{m}_{H,1}, \quad 3)$$

$$\overline{I}_{H,1} = \overline{m}_{H,1}, \quad 4)$$

$$K_{i+1} = \left[1 - \sum_{t=1}^{N} \sum_{\substack{j=1 \\ j \neq t}}^{N} I_{t,i} m_{j,i+1}\right]^{-1}, \quad 5)$$

$$I_{n,i+1} = K_{i+1}[I_{n,i} m_{n,i+1} + I_{H,i} m_{n,i+1} + I_{n,i} m_{H,i+1}](n = 1, 2, \ldots, N), \quad 6)$$

$$\tilde{I}_{H,i+1} = K_{i+1}[\tilde{I}_{H,i}\tilde{m}_{H,i+1} + \overline{I}_{H,i}\tilde{m}_{H,i+1} + \tilde{I}_{H,i}\overline{m}_{H,i+1}], \quad 7)$$

$$\overline{I}_{H,i+1} = K_{i+1}[\overline{I}_{H,i}\overline{m}_{H,i+1}], \text{ and} \quad 8)$$

$$I_{H,i+1} = \overline{I}_{H,i+1} + \tilde{I}_{H,i+1}, \quad 9)$$
$$i = \{1, 2, \ldots, L-1\};$$

viii) generating combined degrees of belief $\beta_n$ and $\beta_H$ using the equations:

$$\beta_n = \frac{I_{n,L}}{1 - \overline{I}_{H,L}} n = 1, 2, \ldots, N, \text{ and}$$

$$\beta_H = \frac{\tilde{I}_{H,L}}{1 - \overline{I}_{H,L}},$$

where
  $\beta_n$ is a degree of belief to which the general criterion is assessed to the $n^{th}$ grade $H_n$, and
  $\beta_H$ is a remaining degree of belief which is not assigned to any specific grade; and ix) generating an overall assessment for each entity a on the general criterion represented as:
$s(a) = \{(H_1, \beta_1(a)), \ldots, (H_n, \beta_n(a)), \ldots, (H_N, \beta_N(a)), (H_H, \beta_H(a))\}.$

2. A method according to claim 1, wherein each grade $H_{n+1}$ is more favorable than $H_n$ and performance indicators of a general criterion are generated using the equations:

$$u_{max} = \sum_{n=1}^{N-1} \beta_n u(H_n) + (\beta_N + \beta_H) u(H_N),$$

$$u_{min} = (\beta_1 + \beta_H) u(H_1) + \sum_{n=2}^{N} \beta_n u(H_n),$$

$$u_{avg} = \frac{u_{max} + u_{min}}{2}; \text{ and}$$

wherein $u_{max}$, $u_{min}$, and $u_{avg}$ are the best possible, worst possible and average performance indicators, respectively, and $u(H_n)$ ($n=1, \ldots, N$) is optionally defined by $$u(H_n) = \frac{n-1}{N-1}.$$

3. A method according to claim 1, wherein the values of $\beta_{n,i}$ are determined using the following steps:
  (i) making an assessment $\{(K_{m,i}, \gamma_{m,i}), m=1, \ldots, M\}$ of the $i^{th}$ basic criteria under a set of grades $\{K_{m,i}, m=1, \ldots, M\}$ defining original assessments; and
  (ii) transforming the assessment $\{(K_{m,i}, \gamma_{m,i}), m=1, \ldots, M\}$ by a computer to an assessment $\{(H_n, \beta_{n,i}), n=1, \ldots, N\}$ of the general criterion under a set of grades $\{H_n, n=1, \ldots, N\}$ so that the assessments of the L basic criteria using different sets of grades are transformed into those using a common set of grades and the transformed assessments are equivalent to the original assessments in terms of value or utility to a decision maker, the transformation using the following matrix:

$$\begin{bmatrix} \beta_{1,i} \\ \beta_{2,i} \\ \vdots \\ \beta_{N,i} \end{bmatrix} = \begin{bmatrix} \alpha_{1,1} & \alpha_{1,2} & \ldots & \alpha_{1,M} \\ \alpha_{2,1} & \alpha_{2,2} & \ldots & \alpha_{2,M} \\ \vdots & \vdots & \ddots & \vdots \\ \alpha_{N,1} & \alpha_{N,2} & \ldots & \alpha_{N,M} \end{bmatrix} = \begin{bmatrix} \gamma_{1,i} \\ \gamma_{2,i} \\ \vdots \\ \gamma_{M,i} \end{bmatrix}$$

where:
  $H_n$ is the $n^{th}$ grade for assessment of the general criterion;
  $K_{m,i}$ is the $m^{th}$ grade for assessment of the $i^{th}$ basic criterion;
  $\alpha_{n,m}$ is the degree to which $K_{m,i}$ implies $H_n$;
  $\gamma_{m,i}$ is the degree to which the $i^{th}$ basic criterion is assessed to $K_{m,i}$; and
  $\beta_{n,i}$ is the degree to which the $i^{th}$ basic criterion is assessed to $H_n$.

* * * * *